Dec. 22, 1936.  H. F. HADLEY  2,065,328

DEFLECTOR AND CONTROL FOR VEHICLE HEATERS

Filed July 15, 1935  2 Sheets-Sheet 1

INVENTOR
Harold F. Hadley
BY
Braselton, Whitcomb Davies
ATTORNEY

Dec. 22, 1936. H. F. HADLEY 2,065,328
DEFLECTOR AND CONTROL FOR VEHICLE HEATERS
Filed July 15, 1935 2 Sheets-Sheet 2

INVENTOR
Harold F. Hadley
BY
ATTORNEY

Patented Dec. 22, 1936

2,065,328

UNITED STATES PATENT OFFICE 2,065,328

DEFLECTOR AND CONTROL FOR VEHICLE HEATERS

Harold F. Hadley, Toledo, Ohio, assignor to John E. Goerlich, Toledo, Ohio

Application July 15, 1935, Serial No. 31,353

7 Claims. (Cl. 98—2)

This invention relates to a heating unit particularly for use in connection with the heating of the interior of an automotive vehicle.

The invention relates more particularly to the type of heating unit wherein a stream of air to be heated is directed over a heating element, the latter being preferably of the hot water type associated with the cooling system of the vehicle or other heat generating or absorbing means.

The present invention embodies an improvement in air deflecting means associated with the heater and capable of relative movement for deflecting or redirecting heated air in a desired direction.

The invention embraces the provision of an assembly of air deflecting baffles forming a means for deflecting heated air in an angular direction with respect to the longitudinal axis of the heating unit, the direction being determined by a rotary positioning of the baffle assembly.

Another feature of the invention resides in a simple, yet effective means operable from a distance remote from the heater for rotating or adjusting the position of said deflector assembly relative to the heating unit.

Still a further object of the invention is the provision of a remote control having a flexible means connected with the deflector for adjusting the deflector assembly to a desired position.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which.

Figure 1:
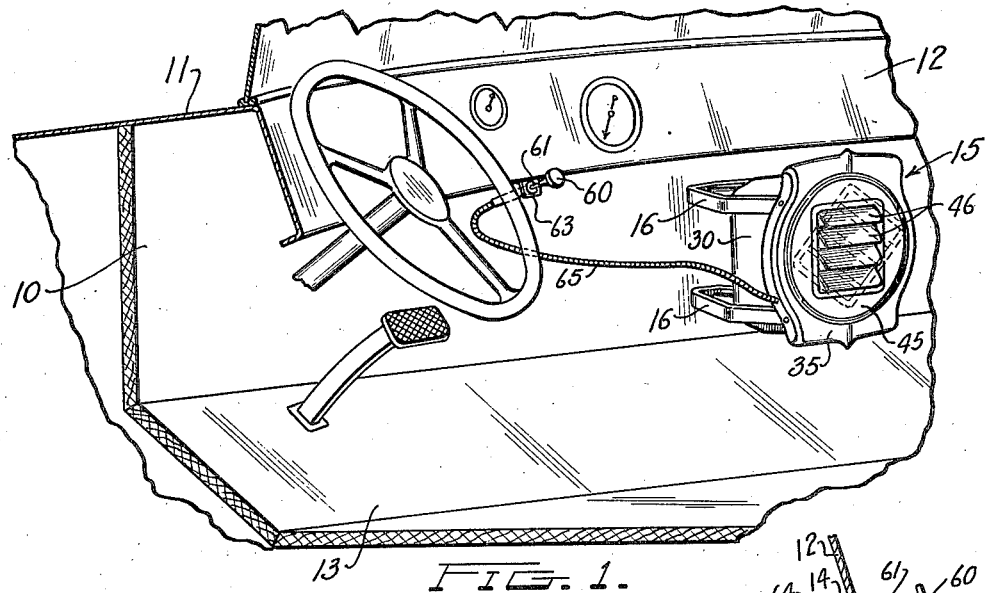
Figure 1 is an isometric view showing a form of installation of a heater of my invention in an automotive vehicle.

Referring particularly to Figure 1, I have illustrated a forward or driver's compartment in the vehicle wherein it is usual to dispose a heater, although it may be positioned in any other portion of the vehicle. As illustrated, numeral 10 designates the dash board of a vehicle having a cowl portion 11, an instrument board 12 and floor board 13 of usual construction. The heater 15 is provided with brackets 16 which are adapted to be secured to the dash board 10 as particularly shown in Figure 4. The brackets 16 have openings to receive threaded bushings 18 which pass through registering openings in the dash board 10, the threaded portion of the bushings adapted to receive retaining nuts 19 and washers 20 to hold the heater in fixed position with respect to the dash board.

In the embodiment illustrated, the heater 15 comprises a core 21 which may be of any suitable type, that illustrated being of the tubular type having vertically positioned tubes 22 provided with transverse heat radiating fins 23 for aiding in dissipating the heat of the fluid medium passing through the core into the surrounding air stream. It is to be understood that other types of core or heat transferring elements may be utilized as for example a cellular core without departing from the scope of the invention. The tubes 22 communicate at the top and bottom with tanks 25 and 26, which in turn are connected by means of fluid supply and return conduits 27 and 28 with the cooling supply of the vehicle or other supply of heated fluid medium. The conduits 27 and 28 preferably pass through the hollow central portions of the threaded bushings 18.

The heating unit may utilize any suitable fluid, as for example, heated water from the cooling system or steam from suitable steam generator or other heat transferring medium without departing from the spirit and scope of the invention. In the embodiment illustrated, I have shown an arrangement in which water 24 is used as the heat transferring medium.

The tanks 25 and 26 and core 21 are preferably surrounded by means of a sheet metal shroud or casing 30 having at its rear portion a central opening to accommodate an air circulating fan 31, the latter being driven by any suitable source of automotive power, that being shown as an electric motor 32. The electric motor is secured by means of screws 29 to the sides of the shroud through the medium of a bracket 33. It is obvious that rotation of the air circulating means or fan 31 will direct a stream of air through the core 21 where heat will be absorbed thereby from the heated medium. The supporting brackets 16 are secured to the shroud by spot-welding or other suitable means such as screws 16'.

Figure 2:
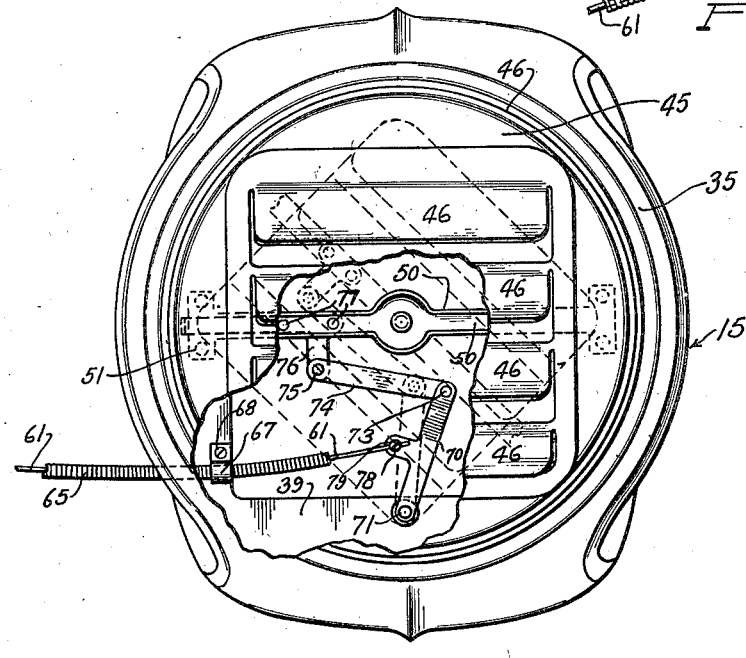
Figure 2 is a front elevational view of a heater embodying my invention, parts being broken away for purposes of illustration.

Positioned forwardly of the shroud 30 is a face plate or cover structure 35 having a rearwardly projecting flange 36 which extends over the forward exterior portion of the shroud 30 and has generally an irregular yet symmetrical appearance as exemplified in Figures 1 and 2. The face plate or cover terminates at its forward portion in a substantially circular beading 37 which defines a large circular opening approximately the area of the core.

Figure 4:
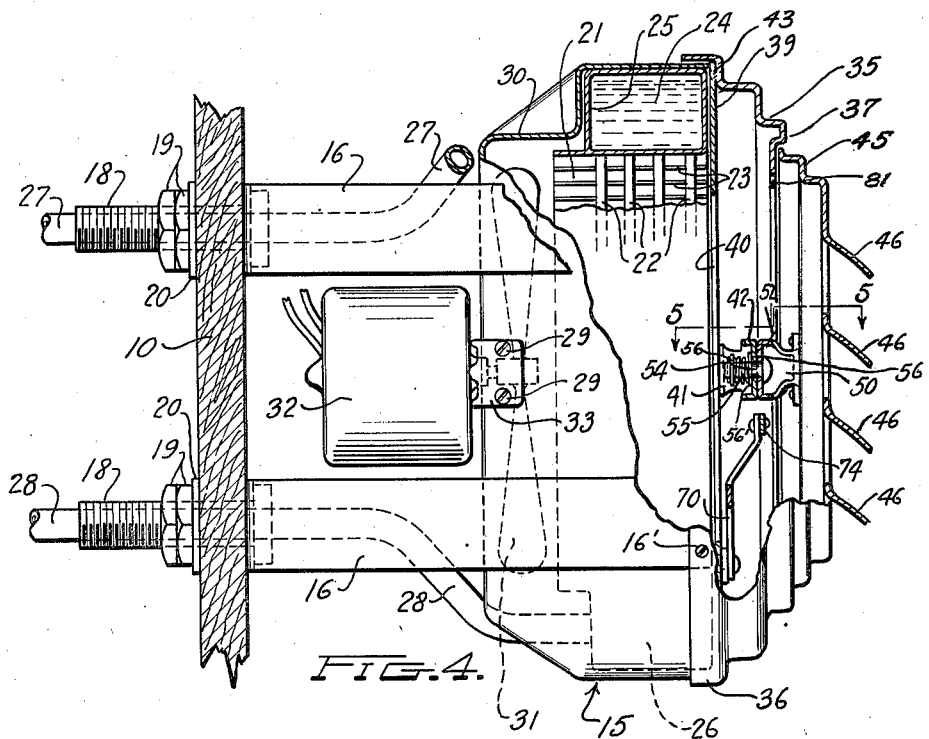
Figure 4 is a vertical sectional view through the heater showing the general arrangement of parts.
Figure 5:
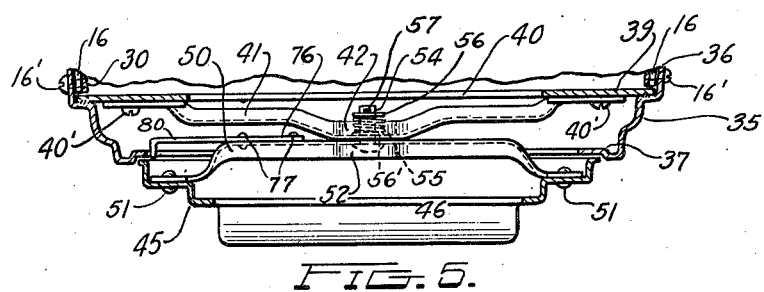
Figure 5 is a horizontal sectional view taken substantially on line 5—5 of Figure 4, especially showing a form of mounting for the deflector assembly.

Positioned adjacent the forward portion of the core is an element or plate 39, the outer edge of which is preferably the same contour as fits within the cover 35, the element 39 being preferably spot-welded or otherwise secured to the face plate as at 43 forming a part of the cover structure. The element 39 is formed with a central opening 40 to admit the passage of air, the face plate 35 being secured in position on the shroud by means of screws 16'. Secured to plate 39 by means of screws 40' or other suitable means is a bracket 41 extending across the opening 40 in the plate 39, which bracket has a central boss portion 42 as illustrated in Figures 4 and 5.

Positioned adjacent the forward portion of face plate 35 is a deflector frame 45 provided with spaced baffles or air deflecting means 46 which, as illustrated, are formed integrally with the frame member, although the same may be fabricated separately and secured to the frame or may be pivotally mounted thereon without departing from the scope of the invention. As illustrated in Figure 4, the baffles 46 are positioned at an angle with respect to the axis of the heater structure so as to deflect heated air at an angle as it is forced through the heat transfer element by means of the air circulating fan 31.

A bracket 50 is secured by means of rivets 51 or other suitable means to the element 45 and has a central boss portion 52 which coincides with the central boss portion 42 of bracket 41. The deflector structure is rotatably mounted upon bracket 41 carried by the face plate 39 by means of a headed pin 54 as illustrated in Figure 4, the pin passing through registering central openings in the boss portions 42 and 52 of the brackets 41 and 50. An expansive coil spring 55 is carried upon the pin 54 between washers 56 and 56' which is held in place by means of a cotter key 57, the spring serving to hold the movable bracket 50 to the stationary bracket 41 under the compressive stress of spring 55 which tends to hold the deflector structure in adjusted position because of the friction set up between the brackets, as well as tending to eliminate vibration of the deflector structure which may tend to arise by reason of the vibratory movements of the vehicle in which the heater is positioned. This form of mounting of the deflector structure permits the latter to be rotated so as to change the relative position of the baffles 46 to direct the heated air in various directions.

Figure 3:
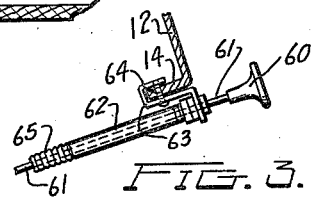
Figure 3 is a fragmentary detail view of a manipulating control means forming a part of the present invention.

In order to readily rotate or adjust the air deflecting means with respect to the face plate, I have provided a remote control means in the form of a manipulating button 60 secured to the end of a flexible wire 61, the latter passing through a sleeve 62, which in turn is secured to a bracket 63, which is adapted to be clamped to a portion of the vehicle structure, as for example, a flange 14 of the instrument panel 12, as illustrated in detail in Figure 3. The bracket 63 may be held to the instrument panel by means of a screw 64 or other suitable fastening means. The flexible wire 61 is guided by means of a flexible sheath or guide 65 to a clip 67 secured to plate 39 by means of a screw 68, the control wire and sheath passing through an opening in the side wall of the face plate 35.

With particular reference to Figure 2, I have provided an arm or link 70 which is pivoted to plate 39 as at 71 which has its upper extremity pivoted as at 73 to a link 74. The other end of the link is pivoted as at 75 to member 76, the latter in turn being riveted as at 77 or otherwise secured to bracket 50 forming a part of the deflector assembly. The extremity of the flexible control wire 61 is connected to a projection 78 formed on the arm 70 by means of a screw 79.

In the position illustrated in Figure 1, the deflector assembly is arranged to direct the air downwardly in a vertical direction when the control button 60 is in partially withdrawn position being indicated in full lines in Figure 2. When, however, it is desired to deflect the current of heated air to either side of the heater, the control button may be withdrawn further or pushed all the way in which causes the deflector assembly to be rotated about the pin 54 through the medium of the wire 61, arm 70 and link 74 whereby the deflectors take up a position different from that illustrated in Figure 1, as for example, as illustrated in dotted lines in Figure 2 when the control button is pulled outwardly. It is to be understood that intermediate positions of the deflector may be had by proportionately adjusting the position of the control button, which movement is in turn communicated to the deflector assembly to rotate the latter. The arrangement of linkage described provides a motion multiplying means whereby the deflector assembly may be rotated through a considerable arc as compared with the corresponding linear movement of the control cable, as the point of connection of link 74 with the deflector assembly has greater corresponding linear movement than the point of connection of the link 70 with the cable 61 as illustrated in the embodiment of Figure 2. In order that the assembly may have a limiting position of tilt, although it is not essential to the operation of the arrangement, I have incorporated a stop means as illustrated in the form of an extension 80 formed on the bracket 76 which is adapted when the plane of the vanes are adjusted substantially vertically to engage a projection 81 (see Figure 4) formed on the face plate 35 to define or limit the angular or rotative movement of the deflector structure in a clockwise direction. The anticlockwise rotative movement of the deflectors may be limited by the control button 60 engaging the bracket 63 in the innermost position of the button.

It is apparent that, within the scope of the invention, modifications and different arrangements may be made other than is herein disclosed, and the present disclosure is illustrative merely, the invention comprehending all variations thereof.

What I claim is:

1. In a heater, the combination of a heat radiating element; means for delivering a forced draft of air therethrough; a casing surrounding said heat radiating element having an opening to permit the passage of heated air therethrough; air deflecting baffles; a frame carrying said air deflecting baffles; said frame being mounted for rotatable movement about a central axis in front of the opening in said casing; a link pivotally connected to said frame; a second link pivotally connected to said first mentioned link and to a relatively fixed portion of the heater; and a flexible cable control associated with one of said links for regulating the relative movement of said frame and air deflecting baffles.

2. In a heater, the combination of a heat radiating element; a casing surrounding same having an opening at the front; means for circulating a current of air through said heat radiating element; a frame; air deflecting means carried by said frame, said frame and air deflecting means being rotatably mounted adjacent the opening in said casing and arranged to be moved to different positions to redirect the current of air passing through said heat radiating element; a plurality of links pivotally connecting said frame to a relatively fixed portion of the heater; a flexible control wire connected to one of said links; and a manipulating means positioned remotely with respect to said heater and connected to said control wire for adjusting the relative position of said air deflecting means.

3. In a heater, the combination of a heat radiating element; a casing surrounding same having an opening therein; means for circulating a current of air through said heat radiating element; baffle means rotatably mounted adjacent the opening in said casing and arranged to be moved to different positions to redirect the current of air passing through said core; a plurality of links connecting said baffle means with a relatively stationary portion of said heater; and means positioned remotely with respect to said heater and connected to one of said links for adjusting the relative position of said baffle means.

4. In a heater, the combination of a heat radiating element; means for delivering a forced draft of air therethrough; a casing surrounding said heat radiating element having an opening to permit the passage of heated air therethrough; a frame; a plurality of air deflectors formed integrally with said frame; a stationary bar disposed in front of said radiating element, said frame being pivotally mounted on said bar; linkage connecting said frame to a relatively fixed portion of the heater; and a flexible cable control associated with said linkage for regulating the pivotal movement of said frame and deflectors.

5. In a heater, the combination of a heat radiating unit; a shroud surrounding said unit and having an opening in the forward portion thereof; a cover structure secured to said shroud and having a circular opening; a deflector assembly positioned in front of said circular opening, said deflector assembly being pivoted for rotary movement about a central longitudinal axis; a pair of links connecting said deflector assembly to said cover structure; a flexible wire connected to said linkage and terminating at a point remote from said deflector assembly; and a manipulating button associated with the remote extremity of said flexible wire for rotatably adjusting said deflector assembly about its longitudinal axis.

6. In a heater, a combination of a heat radiating core; a shroud surrounding said core and having an opening in the forward portion thereof; a cover secured to said shroud and having a circular opening; a plate having an opening, said plate being secured to said cover; a deflector assembly positioned in front of the opening in said cover, said deflector assembly being pivoted for rotary movement about a central longitudinal axis; linkage connecting said deflector assembly to said plate; a cable connected to said linkage and terminating at a point remote from said heater; and manipulating means associated with the remote extremity of said cable for rotatably adjusting said deflector assembly about its longitudinal axis.

7. In a heater, a combination of a heat radiating core; a shroud surrounding said core and having an opening in the forward portion thereof; a cover structure secured to said shroud, said cover structure having an opening therein; a deflector assembly secured to said cover structure and positioned in front of the opening therein, said deflector assembly being mounted for relative rotary movement; a cable terminating at a point remote from said heater; motion multiplying means connecting said cable with said deflector assembly; and manipulating means associated with the remote extremity of said cable for rotatably adjusting said deflector assembly.

HAROLD F. HADLEY.